US006789144B1

(12) United States Patent
Lai et al.

(10) Patent No.: US 6,789,144 B1
(45) Date of Patent: Sep. 7, 2004

(54) APPARATUS AND METHOD IN A NETWORK INTERFACE DEVICE FOR DETERMINING DATA AVAILABILITY IN A RANDOM ACCESS MEMORY

(75) Inventors: Po-Shen Lai, San Jose, CA (US); Autumn J. Niu, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/320,579

(22) Filed: May 27, 1999

(51) Int. Cl.[7] ................................................ G06F 5/00
(52) U.S. Cl. ..................... 710/57; 710/55; 369/27.01; 369/30.04
(58) Field of Search ............................. 709/250, 251, 709/252, 253, 321, 322, 323, 327; 710/20, 22, 34, 56, 57; 370/359, 419, 463, 305, 308; 379/9.06, 26.01, 93.05; 455/557; 345/558; 711/104, 105

(56) References Cited

U.S. PATENT DOCUMENTS

| | | | | |
|---|---|---|---|---|
| 4,507,760 A | * | 3/1985 | Fraser ......................... 365/221 |
| 4,611,322 A | * | 9/1986 | Larson et al. ................ 370/232 |
| 4,833,651 A | * | 5/1989 | Seltzer et al. ............ 365/189.07 |
| 4,942,553 A | * | 7/1990 | Dalrymple et al. ............ 710/57 |
| 4,991,972 A | * | 2/1991 | Ikenoue et al. .............. 358/1.14 |
| 5,016,221 A | * | 5/1991 | Hamstra ...................... 365/221 |
| 5,121,480 A | * | 6/1992 | Bonke et al. ................... 711/2 |
| 5,210,749 A | * | 5/1993 | Firoozmand ................. 340/463 |
| 5,388,074 A | * | 2/1995 | Buckenmaier ........... 365/189.05 |
| 5,553,302 A | * | 9/1996 | Morrissey et al. .............. 710/5 |
| 5,633,865 A | * | 5/1997 | Short .......................... 370/412 |
| 5,668,767 A | * | 9/1997 | Barringer .................... 365/221 |
| 5,796,413 A | * | 8/1998 | Shipp et al. ................. 345/522 |
| 5,812,502 A | * | 9/1998 | Hirai et al. ............... 369/47.34 |
| 5,860,119 A | * | 1/1999 | Dockser ...................... 711/156 |
| 6,047,001 A | * | 4/2000 | Kuo et al. ................... 370/428 |
| 6,061,767 A | * | 5/2000 | Kuo et al. ................... 711/156 |
| 6,061,768 A | * | 5/2000 | Kuo et al. ................... 711/156 |
| 6,105,079 A | * | 8/2000 | Kuo et al. ..................... 710/25 |
| 6,128,308 A | * | 10/2000 | Kuo et al. ................... 370/428 |
| 6,154,796 A | * | 11/2000 | Kuo et al. ..................... 710/52 |
| 6,161,160 A | * | 12/2000 | Niu et al. .................... 710/310 |
| 6,201,817 B1 | * | 3/2001 | Sullivan ...................... 370/463 |
| 6,381,659 B2 | * | 4/2002 | Proch et al. ................... 710/57 |
| 6,473,818 B1 | * | 10/2002 | Niu et al. .................... 711/168 |
| 6,516,371 B1 | * | 2/2003 | Lai et al. ..................... 710/305 |
| 6,557,056 B1 | * | 4/2003 | Lanteigne et al. ............. 710/52 |

\* cited by examiner

*Primary Examiner*—Jack B. Harvey
*Assistant Examiner*—Beatriz Prieto (57) ABSTRACT

A network interface device includes a random access memory used as a transmit and receive buffer for transmission and reception of data between a host computer bus and a packet switched network. The network interface device includes a memory controller that determines whether a complete frame is stored in the random access memory and also determines an amount of data available to be read from the oldest received frame. A host CPU is able to access this information and determine whether to read the data or read the data at a later time.

6 Claims, 7 Drawing Sheets

APPARATUS AND METHOD IN A NETWORK INTERFACE DEVICE FOR DETERMINING DATA AVAILABILITY IN A RANDOM ACCESS MEMORY

BACKGROUND OF THE INVENTION

1. Technical Field

The present invention relates to network interfacing and more particularly, to methods and systems or determining data availability for data transmitted over a network and stored in a buffer memory.

2. Background Art

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by a Media Access Controller (MAC), and receive data is stored in a receive FIFO by the MAC prior to transfer to the host computer via a host computer bus interface.

One disadvantage with the use of a FIFO for a transmit buffer or a receive buffer of a network interface device is the high latency encountered during the buffering process. The latency of the network interface device is the time delay between the time that a data frame is supplied to the network interface device and the time the data is transmitted on the network media, or vice versa.

An additional disadvantage with the use of a FIFO for a transmit or receive buffer is the lack of flexibility in reading data. For example, when a host device wishes to read a data frame stored in a receive FIFO, there is no way of determining whether the entire frame has been stored. In situations where the entire data frame has not been stored, the time that the host device spends accessing the receive FIFO and reading a partial frame could be more efficiently spent performing other tasks and the host device could access the receive FIFO after a complete frame has been stored.

DISCLOSURE OF THE INVENTION

There is a need for an arrangement that enables the use of a random access memory in a network controller, as opposed to a FIFO buffer, to store a data frame and to provide flexibility in reading the data frame.

There is also a need for a method of determining the amount of data available to be read from the oldest received frame stored in a random access memory in a network controller.

These and other needs are met by the present invention, where a network interface device includes a random access memory for storing data frames. The network interface device includes a memory controller that determines the amount of data available to be read from the oldest received frame that is available to be read.

According to one aspect of the invention, a network interface device is provided for buffering data. The network interface device includes a random access memory configured to store a plurality of frames. The network interface device also includes a control device configured to determine an amount of data available to be read from an oldest received frame of the plurality of frames.

Another aspect of the present invention provides a method for determining data availability of data stored in a network interface device. The method includes receiving a plurality of data frames and storing the frames into a random access memory. The method also includes generating a value representing an amount of data from an oldest received frame of the plurality of frames available to be read.

Additional advantages and features of the present invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout.

BEST MODE FOR CARRYING OUT THE INVENTION

The present invention will be described with the example of a network interface device in a packet switched network, such as an Ethernet (IEEE 802.3) network. A description will first be given of a network interface device architecture, followed by the arrangement for accessing frame locations in a buffer memory. It will become apparent, however, that the present invention is also applicable to other network interface device systems.

Network Interface Device Architecture

Figures 1, 1A:
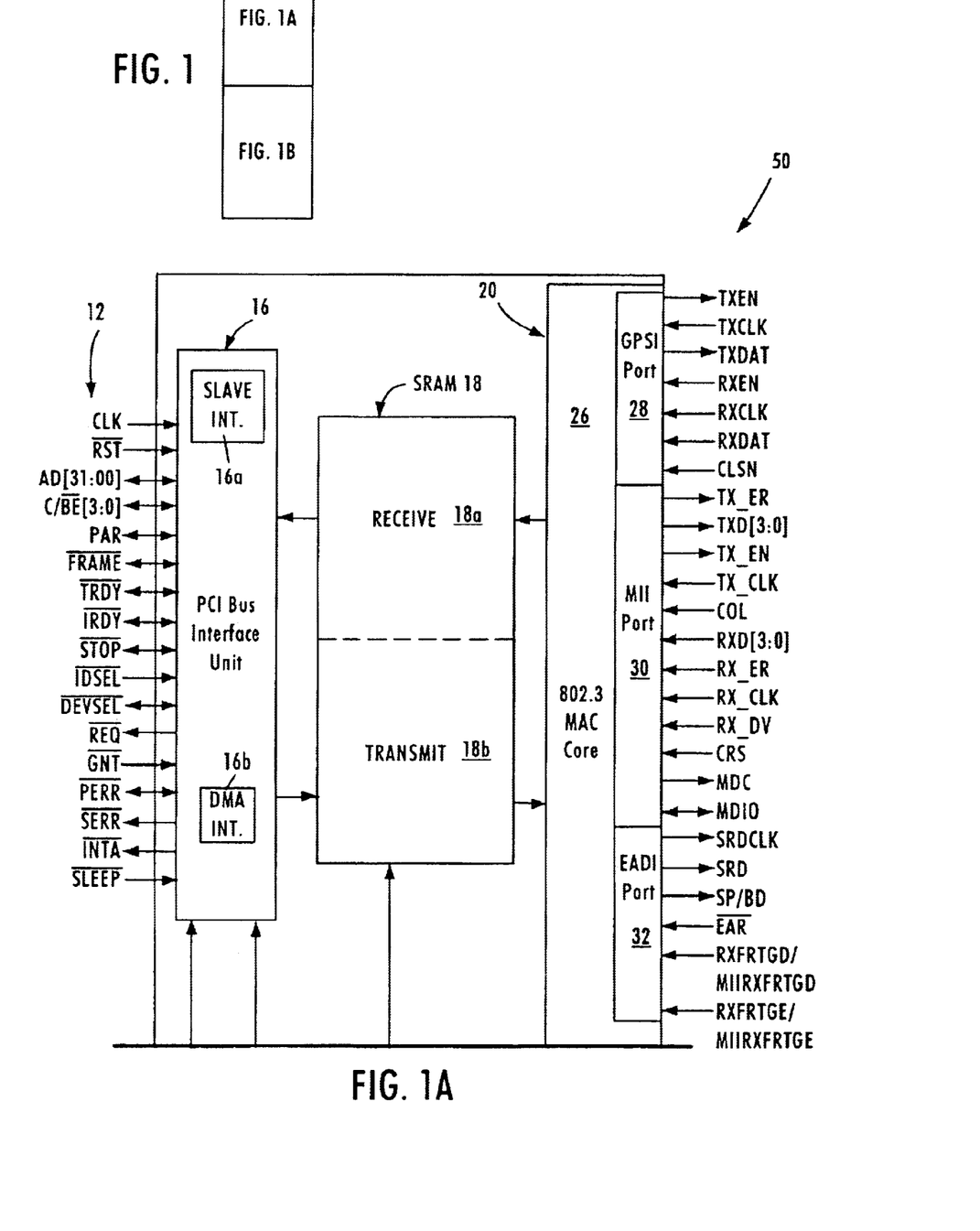
FIGS. 1A and 1B are block diagrams illustrating an exemplary network interface device having a memory controller for writing/reading data frames to/from a random access memory according to an embodiment of the present invention.
Figure 1B:
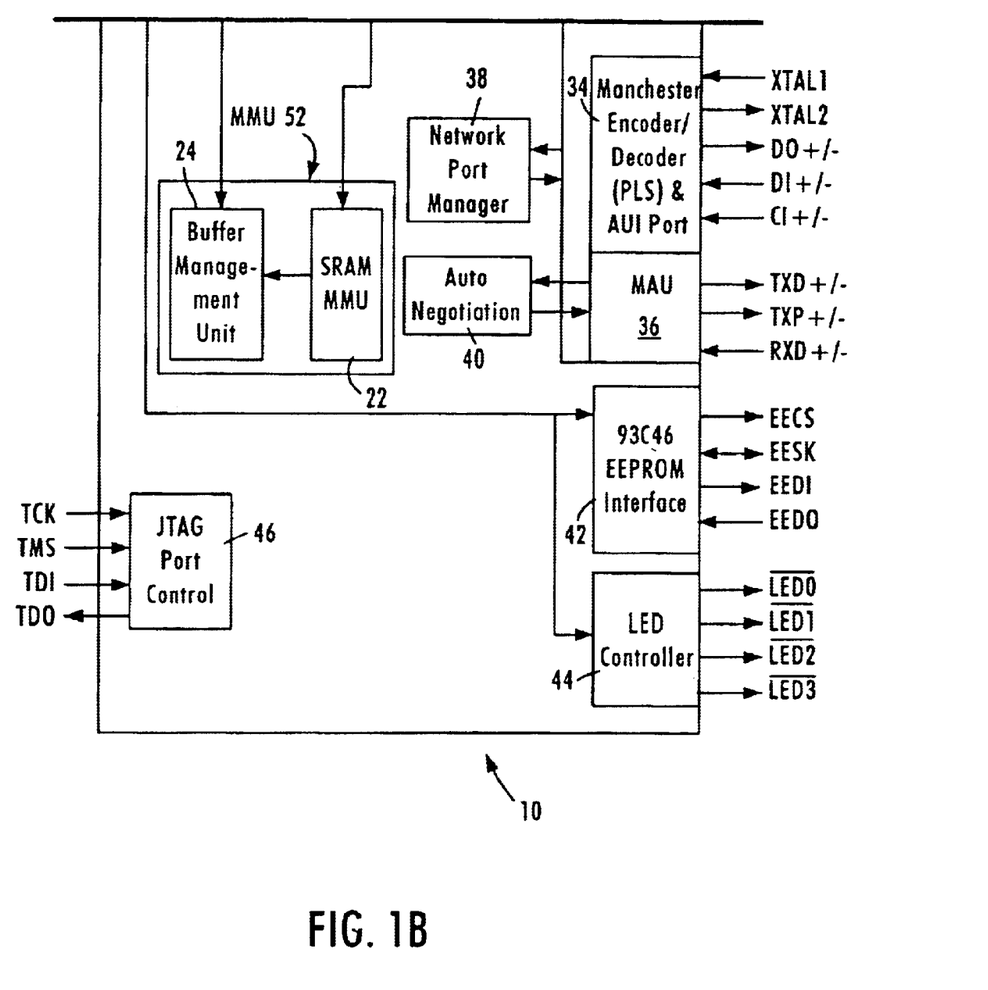

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50. The interface 10 includes a PCI bus interface unit 16, a buffer memory portion 18, and a network interface device portion 20. The PCI bus interface unit 16 includes a PCI slave interface 16a and a direct memory access (DMA) interface 16b. The slave interface 16a manages PCI control and status information including reading and programming of the PCI status registers, but may also be configured for managing slave transfers via the PCI bus with a host CPU (not shown). The DMA interface 16b manages DMA transfers by the network interface device 10 to and from host memory 17, shown in FIG. 2. Hence, the PCI bus interface unit 16 can be selectively configured for PCI transfers in slave and/or master (e.g., DMA) mode.

The memory unit 18 includes a 32-bit SRAM implemented directly on the network interface device chip 10. According to the disclosed embodiment, the SRAM 18 may be accessed in a random access manner under the control of an SRAM memory management unit (MMU) 22, or may be a segmented system with a receive portion 18a and a transmit portion 18b for receive and transmit paths, respectively.

The network interface device 10 also includes a buffer management unit 24 configured for managing DMA transfers based on DMA descriptors in host memory that specify start address, length, etc. The buffer management unit 24 initiates a DMA read from host memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory unit 18. Although the buffer management unit 24 and the SRAM MMU 22 are shown as discrete components, the two units, 22 and 24, may be integrated to form a memory management unit controlling all transfers of data to and from the memory unit 18.

The network interface device 10 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MII handshaking may include link information programming information at the Mil layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 46.

The EEPROM interface 42 connects to an EEPROM on either a network interface device adapter card or the motherboard of the host computer via a serial interface link. The EEPROM (not shown in FIG. 1) will be programmed with configuration information related to the network interface device, enabling the network interface device to be configured during initialization via the EEPROM interface 42.

Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specified protocol, described below.

Memory Management Architecture

Figure 2:
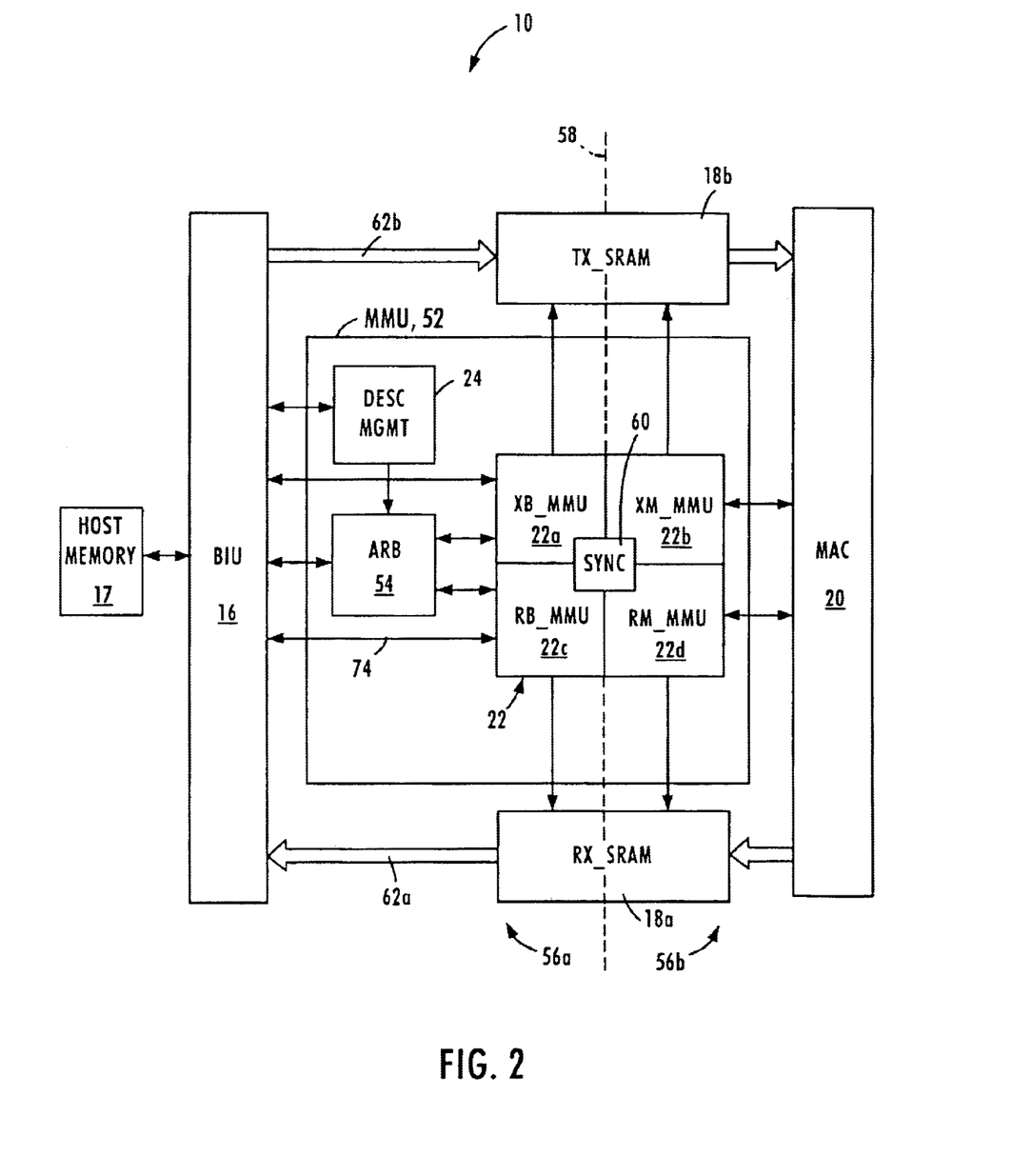
FIG. 2 is a block diagram illustrating the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit 52 includes the buffer management unit 24, also referred to as the descriptor management unit, the SRAM MMU 22, and an arbitration unit 54 The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, schematically indicated as divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20.

The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22*d* synchronous to the receive clock (RX_CLK) in the network clock domain 56*b*. Frame data stored in the RX_SRAM 18*a* is read and output to the BIU 16 via data path 62*a* under the control of the receive-data read controller 22*c*, which reads the frame synchronous to the PCI bus clock signal (CLK).

Similarly, transmit data to be output onto the network by the MAC 20 is written into the TX_SRAM 18*b* via data path 62*b* under the control of the transmit-data write controller 22*a*, configured for writing the frame data synchronized to the PCI bus clock (CLK). The stored transit data is read and output from the TX_SRAM 18*b* to the MAC 20 under the control of the transmit-data read controller 22*b* according to the MAC transmit clock (TX_CLK) within the network clock domain 56*b*.

The presence of two separate clock domains 56*a* and 56*b* in writing and reading to a random access memory 18 requires that the write controller and read controller devices be coordinated and synchronized to ensure that no contention issues arise due to the relative independence of the two clock domains 56*a* and 56*b*. The SRAM MMU 22 includes a synchronization circuit 60 that asynchronously monitors the status of the RX_SRAM 18*a* and TX_SRAM 18*b*, enabling the memory controllers to read and write to the memory 18 between the two clock domains 56*a* and 56*b*. Thus, problems that would ordinarily arise between the two clock domains in the individual memory management units 22*a*, 22*b*, 22*c* and 22*d* are avoided by use of the synchronization circuit 60 according to a prescribed arbitration logic.

Figure 3A:
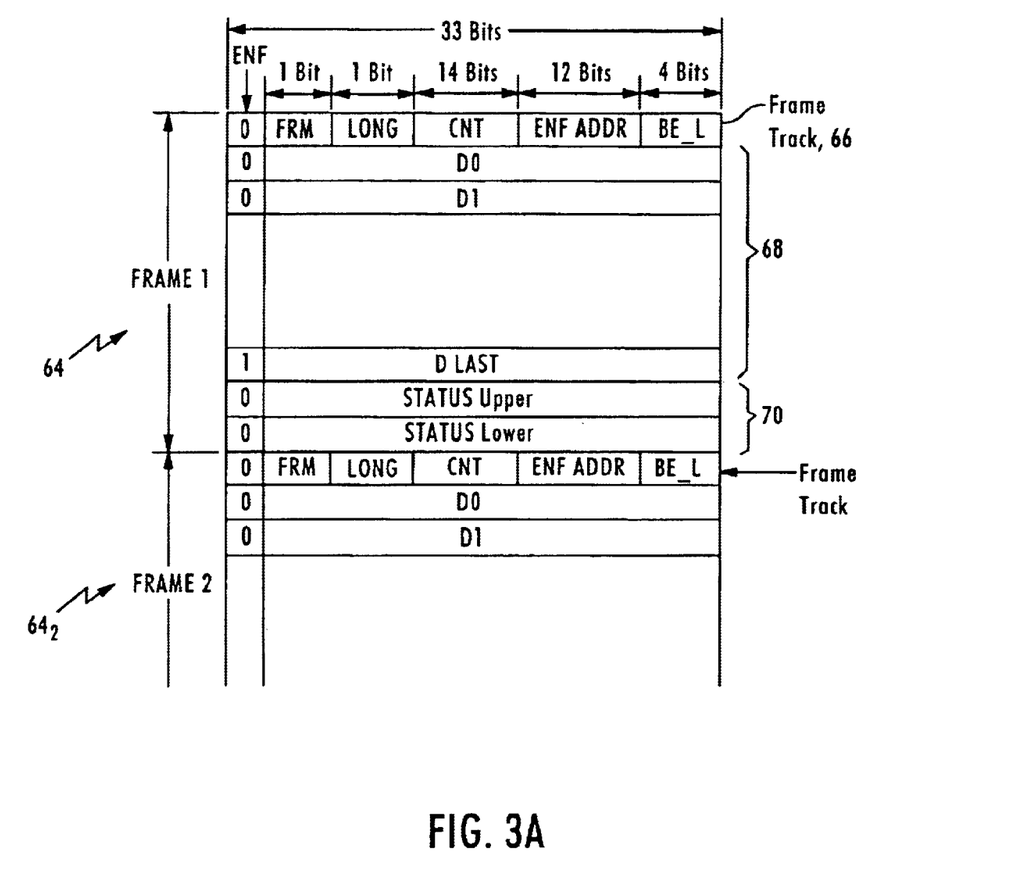
FIGS. 3A and 3B are diagrams illustrating an exemplary data structure of a data frame stored in the random access memory of FIG. 1.
Figure 3B:
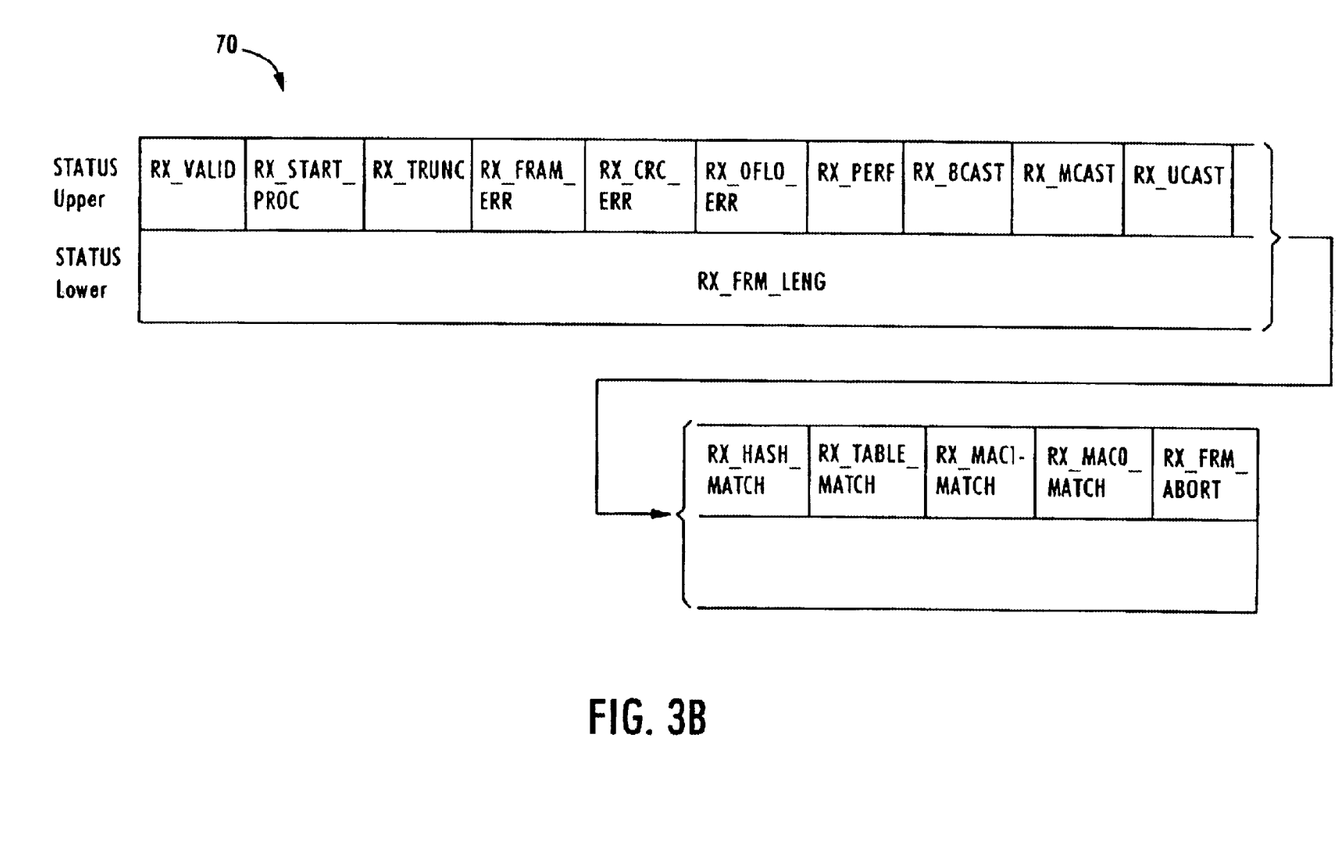

FIG. 3 is a diagram illustrating a data structure of a receive data unit in RX_SRAM 18*a*. A similar structure also may be used for storing data in the TX_SRAM 18*b*. As shown in FIG. 3, each stored frame 64 includes a frame track field 66 preceding a group of data bytes representing the data frame 68 (i.e., the packet data received from MAC 20), followed by a status information field 70. In this case, the RM_MMU 22*d* stores frame track field 66 and the control field 70 related to the receive data frame 68. The frame track field 66 is used by the RB_MMU 22*c* to keep track of the location of the corresponding receive data frame 68 in the RX_SRAM 18*a*. Hence, the frame track field 66 enables the RB_MMU 22*c* to quickly flush a stored frame 64 having receive data 68 and jump to the beginning of the next stored frame (e.g., 64$_2$), based on an end of frame address (ENF ADDR) field, a count (CNT) field specifying the total number of bytes in the receive frame and an end of frame (ENF) bit indicating whether the data frame 64 contains valid data ready for reading.

The frame track field 66 also includes a frame (FRM) field, which indicates that the entire receive data frame 68 is stored in the RX_SRAM 18*a* and a byte enable-last (BE_L) field which specifies how many of the bytes in a DLAST field are valid. The frame track field 66 further contains a long frame (LONG) field which indicates that the expected receive frame length is greater than a predetermined length.

Referring to FIG. 3, in the exemplary embodiment of the invention, write controller (RM_MMU 22*d*) writes the frame 64 in 32-bit wide double word format into contiguous buffer memory locations D0-DLAST following the corresponding memory location for the frame track field 66. Write controller 22*d* continues to write the 32-bit wide frame data fields in the contiguous locations D0, D1, etc. until the reception of an end of frame (RM_ENF) signal from the MAC 20. RM_MMU 22*d* then receives the status information from the MAC 20 and writes the status information 70 into the status information field, i.e., STATUS Upper and STATUS Lower, followed by updating the frame track field 66. The write controller 22*d* then proceeds to write the next frame 64$_2$, i.e, frame track field 66, data field 68 and status information field 70 in the next contiguous memory location, as shown in FIG. 3.

The status information contained in STATUS Upper and STATUS Lower of the status information field 70 is used to provide receive status to the host CPU during slave transfers. The status information 70 is also used by the descriptor management unit 24 to supply DMA receive status during DMA transfers.

Data Availability

As described above, the MMU 52 provides the logic for reading and writing frames to/from SRAMs 18*a* and 18*b*. According to an embodiment of the invention illustrated in FIG. 4, RM_MMU 22*d* utilizes a write pointer (WP) 72 to write data frames into RX_SRAM 18*a* and RB_MMU 22*c* utilizes a read pointer (RP) 74 when reading out data frames from RX_SRAM 18*a*. MAC 20 outputs RM_ADV to advance write pointer 72 in RM_MMU 22*d* and BIU 16 outputs AD_ADV, from the host CPU, to advance read pointer 74 in RB_MMU 22*c*. The respective write and read pointers, 72 and 74, facilitate writing/reading of data and are incremented as data is written to and read from RX_SRAM 18*a*.

Figure 4:
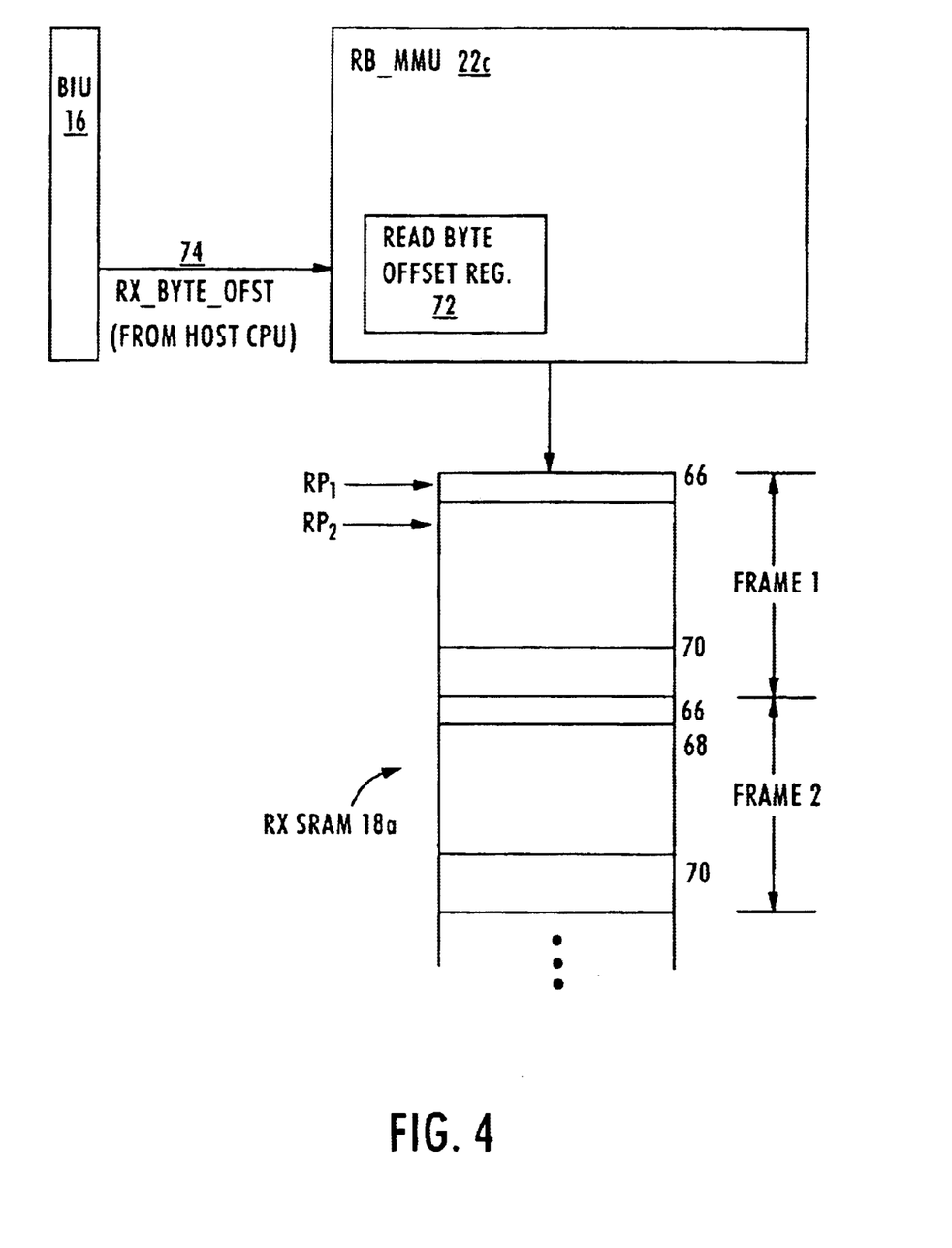
FIG. 4 is a block diagram illustrating the synchronization circuit operation according to an embodiment of the present invention.

The SRAM MMU 22 also includes read and write frame counters for each SRAM 18*a* and 18*b* to enable the synchronization circuit 60 to track the number of stored data frames. The synchronization circuit 60 tracks the number of stored data frames based on the difference between a write frame counter value and a read frame counter value.

According to the exemplary embodiment of the present invention, write counter 76 and read counter 78 are implemented as gray code counters, such that only a single bit of a counter value is changed in response to assertion of the status signal from the corresponding memory controller 22. Use of the gray code counter ensures that any asynchronous comparison between the write frame counter 76 and the read frame counter 78 does not result in any erroneous values due to multiple bit transitions that may otherwise occur in counters using binary-format representations.

The gray code counters 76 and 78 output their respective counter values to an asynchronous comparator 82, typically composed of a plurality of exclusive OR gates. The comparator 82 generates a comparison result indicating the presence of a stored frame based on the first and second counter values, such that the comparator 82 generates a one or more signal (RX_FRM_ONEM) indicating the presence of at least one stored frame in RX_SRAM 18*a* if the stored counter values from the write counter 76 and the read counter 78 are unequal.

The synchronization circuit 60 also includes a receive frame track register 84 for storing the frame track field 66 for the oldest received frame stored in RX_SRAM 18*a*. Synchronization circuit 60 uses the frame track field 66, along with read and write pointers to determine the number of bytes of the oldest received frame stored in RX_SRAM 18*a* that are available to be read.

Referring to FIG. 4, a selection circuit 86 selectively supplies either the frame track field 66 generated by RM_MMU 22*d*, i.e., RM_FRM_TRK, or the frame track field 66 generated by RB_MU 22*c*, i.e., RB_FRM_TRK, to receive frame track register 84, based on the RX_FRM_ONEM signal. For example, when RX_FRM_ONEM is equal to "1", indicating one or more frames are stored in RX_SRAM 18a, selection circuit 86 stores RB_FRM_TRK in receive frame track register 84, thereby giving priority to read controller 22c. When RX_FRM_ONEM is "0", indicating less than one full frame is stored in RX_SRAM 18a, selection circuit 86 stores RM_FRM_TRK in receive frame track register 84, thereby giving priority to write controller 22d.

Byte counter 90 also receives RX_FRM_ONEM, along with WP and RP from RM_MMU 22d and RB_MMU 22c respectively. In alternative embodiments, synchronization circuit 60 includes registers to store the WP and RP values. Byte counter 90 includes logic to determine the number of bytes available to be read from the oldest received frame in RX_SRAM 18a.

When RX_FRM_ONEM is "0", indicating less than one complete frame is stored in RX_SRAM 18a, byte counter 90 subtracts the read pointer value from the write pointer value, i.e., WP-RP, to determine the number of bytes available to be read from the oldest received frame stored in RX_SRAM 18a. The synchronization circuit 60 then transmits this value, i.e., RX_FRM_BYTES_AVAIL, to receive frame bytes available register 92 in RB_MMU 22c.

Figure 5A:
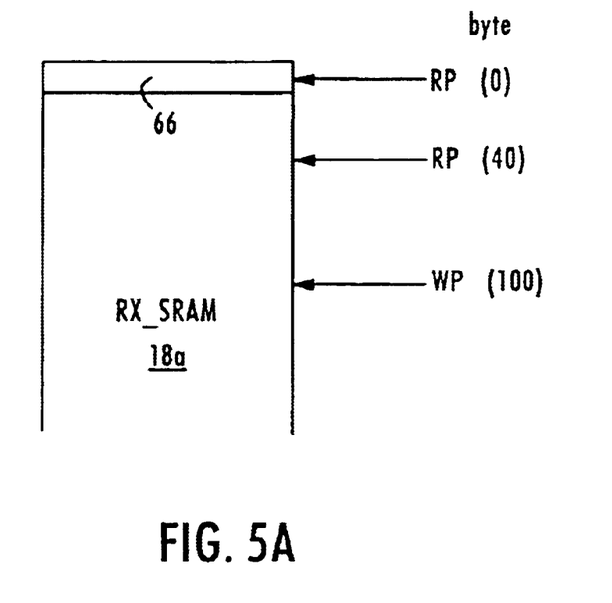
FIGS. 5A and 5B illustrate an exemplary operation of the synchronization circuit in conjunction with the data structure of FIG. 3.

For example, referring to FIG. 5A, suppose RX_FRM_ONEM is "0", 100 bytes of data are stored in RX_SRAM 18a and no bytes have been read. In this scenario, the write pointer, indicated by WP, is pointing to the address corresponding to byte 100 and the read pointer, indicated by $RP_1$, is pointing to the address corresponding to byte 0. The byte counter 90 subtracts 0 from 100 and determines that 100 bytes in the oldest received frame are available to be read. Synchronization circuit 60 then outputs this value to the receive frame bytes available register 92 in RB_MMU 22c. Alternatively, assume that the read pointer, indicated by $RP_2$ in FIG. 5A, is pointing to the address corresponding to byte 40, i.e., 40 bytes of data have already been read. Byte counter 90 then subtracts 40 from 100 and determines that 60 bytes are available to be read. Synchronization circuit 60 then outputs this value to the receive frame bytes available register 92.

When RX_FRM_ONEM is "1", indicating that one or more complete data frames is stored in RX_SRAM 18a, byte counter 90 reads the contents of receive frame track register 84 to determine the end of frame address, via ENF ADDR field, for the oldest received frame stored in RX_SRAM 18a. Next, the byte counter 90 subtracts the read pointer value from the end of frame address, i.e., ENF ADDR-RP, to determine the number of bytes in the oldest received frame that are available to be read.

Figure 5B:
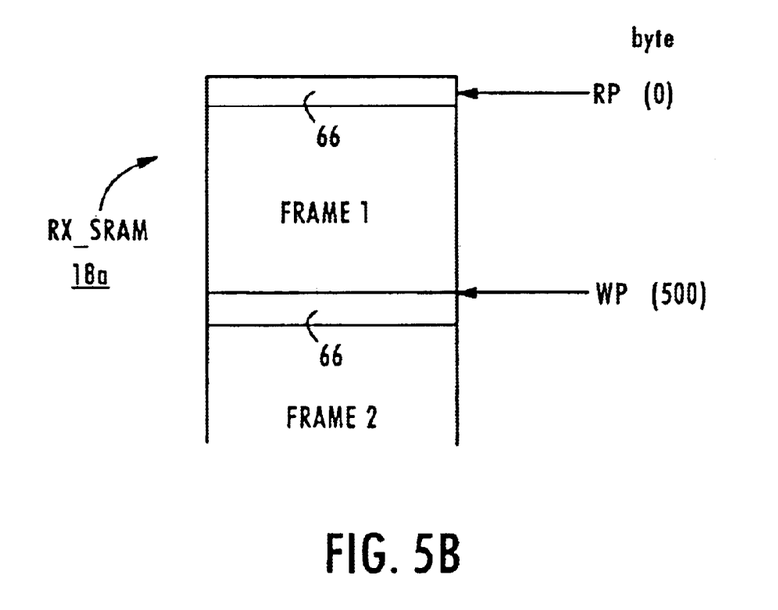

For example, referring to FIG. 5B, suppose that the ENF ADDR corresponds to byte address 500, i.e., 500 bytes of data are stored in RX_SRAM 18a. Further assume that no data has been read out, i.e., read pointer, indicated by RP is pointing to an address corresponding to byte 0. The byte counter 90 subtracts 0 from 500 to generate a value of 500. Synchronization circuit 60 then outputs this value to the receive frame bytes available register 92.

The receive frame bytes available register 92 is dynamically updated as data is written/read to/from RX_SRAM 18a using the procedure described above. In alternative embodiments where bit granularity is desired, the receive frame bytes available register can be used to indicate the number of bits available to be read.

The receive frame bytes available register 92 also includes an end of frame (RX_END_OF_FRM) field. This field is driven by RX_FRM_ONEM and indicates whether at least one complete frame is stored in RX_SRAM 18a. That is, when RX_END_OF FRM =1, at least one complete frame is stored in RX_SRAM 18a. The RX_END_OF_FRM bit is reset to zero after the status field, i.e., STATUS Upper and STATUS Lower, corresponding to the completed frame has been read and there are no other completed frames in RX_SRAM 18a. If another completed frame is in RX_SRAM 18a, RX_END_OF_FRM will remain set to "1".

The receive frame bytes available register 92 enables the host CPU to quickly ascertain the status of data in RX_SRAM 18a. For example, when $RX_{13}$ $END_{13}$ $OF_{13}$ FRM =0, $RX_{13}$ $FRM_{13}$ $BYTES_{13}$ AVAIL indicates the number of bytes that have been received and have not been read. When RX_END_OF_FRM =1, RX_FRM_BYTES_AVAIL indicates the number of bytes in the oldest received frame remaining to be read.

Described has been a method and apparatus for determining data availability in a network interface device. The present invention advantageously enables a host processor to increase its flexibility in determining whether to read data in stored in the interface device. For example, the host CPU is able to read the contents of the receive frame bytes available register 92 to determine whether at least one completed frame is stored in RX_SRAM 18a. In situations where a complete frame is not stored, the host CPU may decide to perform another function and return to RX_SRAM 18a when a complete frame has been stored. Advantageously, this increases the efficiency in processing data stored in the interface device. Additionally, the host CPU is able to determine the particular amount of data available to be read from the oldest frame stored in RX_SRAM 18a. Advantageously, this information further enables the host CPU to make informed decisions on whether to read data from RX_SRAM 18a.

In this disclosure, there is shown and described only certain preferred embodiments of the invention, but, as aforementioned, it is to be understood that the invention is capable of use in various other combinations and environments and is capable of changes or modifications within the scope of the inventive concept as expressed herein.

What is claimed is:

1. A network interface device, comprising:
   a random access memory configured to store a plurality of frames, each frame including a frame track field including at least an end of frame address and end of frame bit;
   a control device configured to determine an amount of data from an oldest received frame of the plurality of frames available to be read and to determine whether at least one complete frame is stored in the random access memory;
   a register configured to store information representing said amount of data available to be read, and
   a frame status register configured to store the frame track field for the oldest received frame, wherein the control device comprises:
      a write controller configured to write data to the random access memory using a write pointer register, wherein the contents of the write pointer register are incremented as the data is written,
      a read controller configured to read data stored in the random access memory using a read pointer register, wherein the contents of the read pointer register are incremented as the data is read, and
      a counter for determining the number of bytes of data from the oldest received frame that are available to be read, and the counter is configured to subtract the contents of the read pointer register from the end of frame address for the oldest received frame when one or more complete frames are stored in the random access memory.

2. The network interface device of claim 1, wherein the register is further configured to store information representing whether at least one complete frame is stored in the random access memory.

3. The network interface device of claim 1, wherein the counter is configured to subtract the contents of the read pointer register from the contents of the write pointer register when less than one complete frame is stored in the random access memory.

4. In a network interface device that stores data frame, a method of determining data availability comprising:

receiving a plurality of data frames, each frame including a frame track field including at least an end of frame address and end of frame bit;

storing the plurality of data frames into a random access memory, the storing including
      writing data to the random access memory,
      incrementing a write pointer as data is written,
      reading data from the random access memory, and
      incrementing a read pointer as data is read;

generating a value representing a number of bytes of data from an oldest received frame of the plurality of frames available to be read and storing the value in a programmable register;

storing the frame track field four the oldest received frame in a frame status register;

determining whether at least one complete frame is stored in the random access memory;

storing, in the programmable register, data indicating whether at least one complete frame is stored in the random access memory; and subtracting a value of the read pointer from the end of frame address for the oldest frame stored in the random access memory when the data stored in the programmable register indicates that one or more complete frames are stored in the random access memory.

5. The method of claim 4, comprising: dynamically updating the contents of the programmable register as data is being written to and read from the random access memory.

6. The method of claim 4, comprising: subtracting the value of the read pointer from the value of the write pointer when less than one complete frame is stored in the random access memory.

* * * * *